United States Patent

Taylor

[15] 3,690,717
[45] Sept. 12, 1972

[54] VEHICLE TRANSPORT

[72] Inventor: Glenn Edward Taylor, P.O. Box 93006 Martech Station, Atlanta, Ga. 30318

[22] Filed: Dec. 11, 1970

[21] Appl. No.: 97,187

[52] U.S. Cl. ..............................296/1 A, 105/368 R
[51] Int. Cl. ...............................................B60p 3/08
[58] Field of Search ....................296/1 A; 105/368 R

[56] References Cited

UNITED STATES PATENTS

| | | |
|---|---|---|
| 3,145,043 | 8/1964 | Gyori et al. .................296/1 A |
| 3,084,970 | 4/1963 | Day ...........................296/1 A |
| 2,461,927 | 2/1949 | Schaldach..................296/1 A |
| 3,104,127 | 9/1963 | Swartzwelder............296/1 A |

FOREIGN PATENTS OR APPLICATIONS 711,289   6/1954   Great Britain.............296/1 A

*Primary Examiner*—Benjamin Hersh
*Assistant Examiner*—John A. Pekar
*Attorney*—Watson, Cole, Grindle & Watson

[57] ABSTRACT

A vehicle transport including a low-bed trailer in which the spaced side frames of the superstructure, except for the connection between their bottom edges, are interconnected solely by vertically adjustable horizontal cross-ties on which the forward ends of track assemblies are swingably supported for vertical adjustment, the rear ends of the respective track assemblies being vertically adjustable independently of their forward ends. All of the supporting and adjusting means for such assemblies are located within vertical planes common to the respective side frames of the trailer.

6 Claims, 12 Drawing Figures

Patented Sept. 12, 1972
3,690,717
5 Sheets-Sheet 1
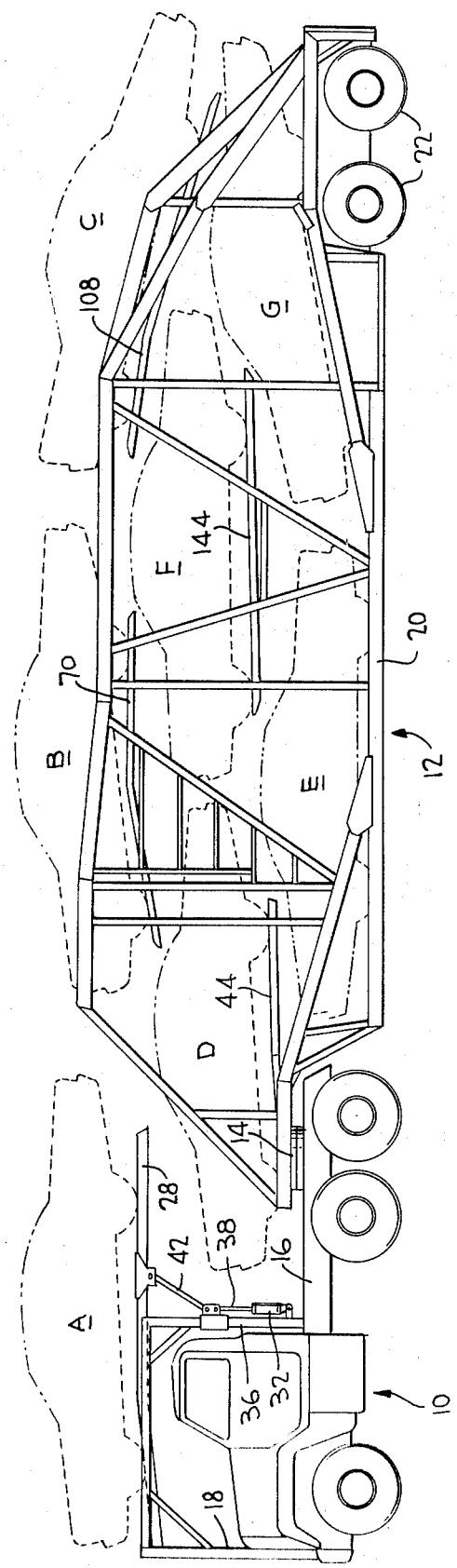
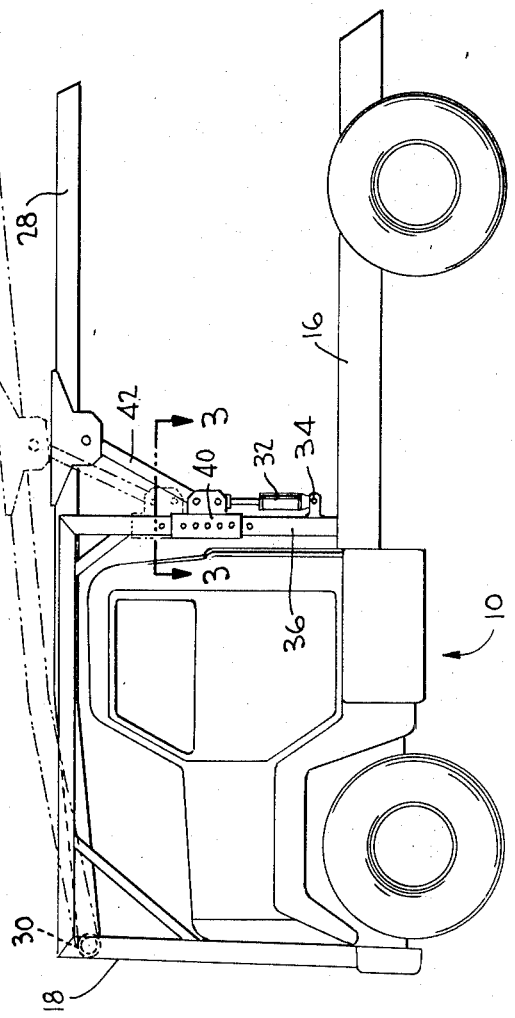
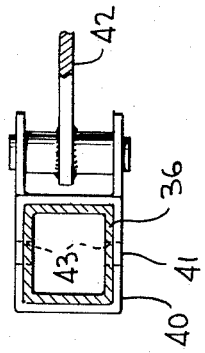
INVENTOR,
GLENN E. TAYLOR
BY Watson, Cole, Grindle & Watson
ATTORNEYS

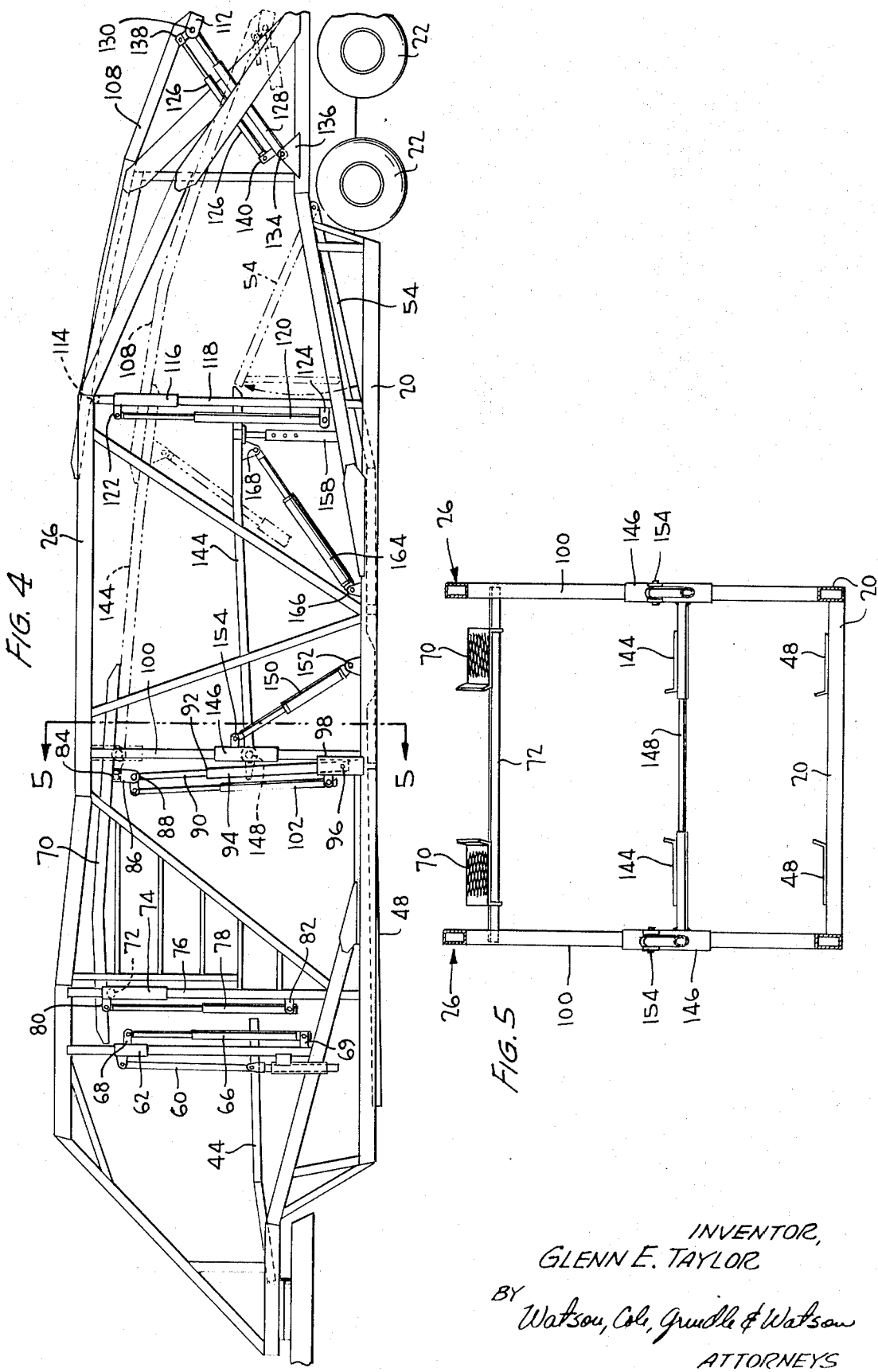

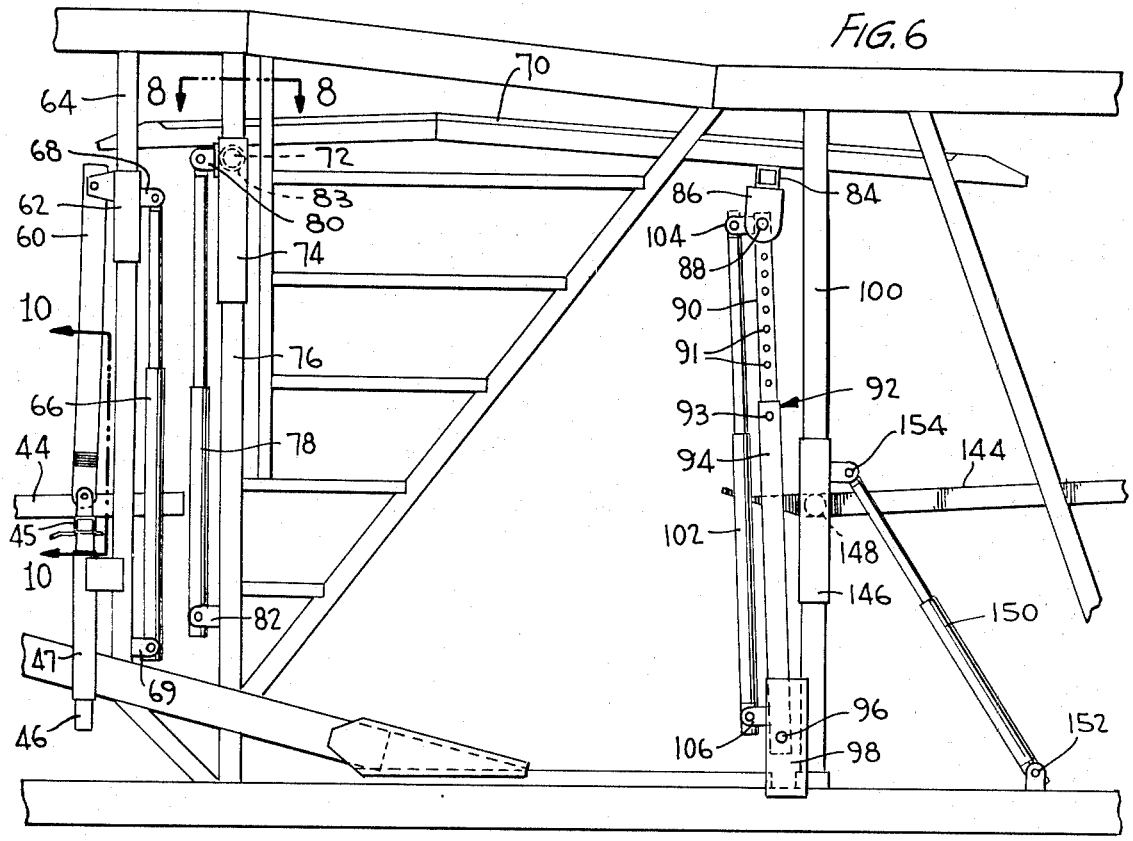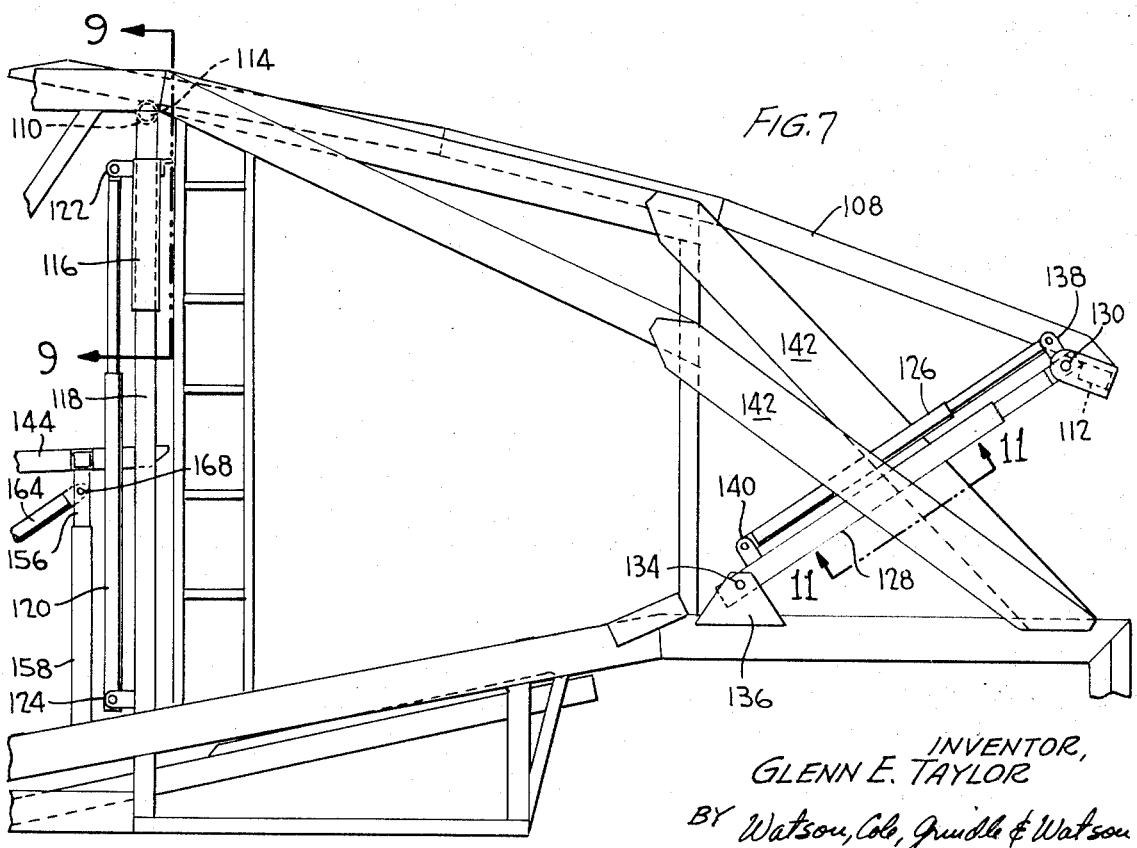

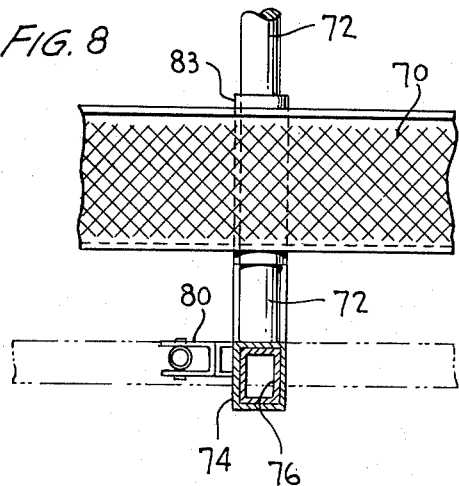
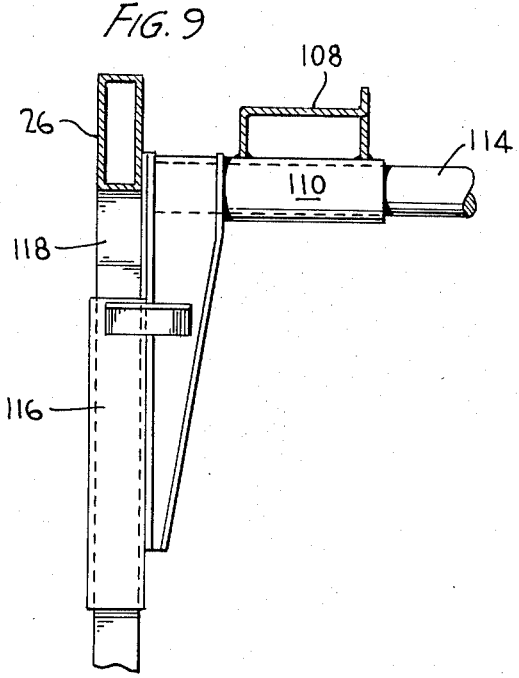
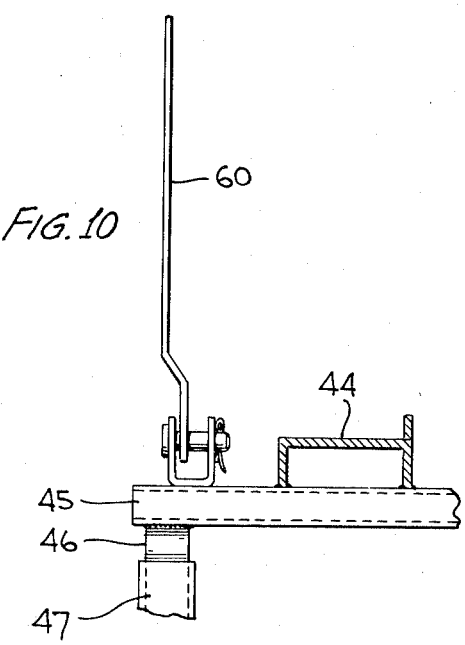
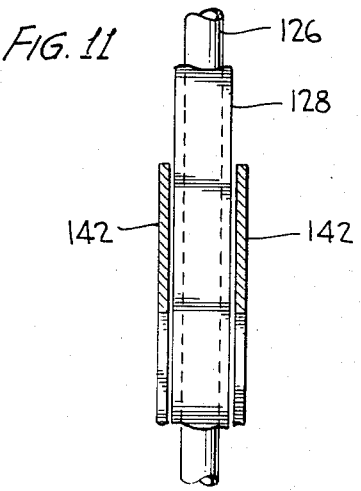

INVENTOR,
GLENN E. TAYLOR
BY
Watson, Cole, Grindle & Watson
ATTORNEYS 3,690,717

VEHICLE TRANSPORT

This invention relates to improvements in a vehicle transport of the type including a tractor trailer combination in which the trailer has a super structure defined by relatively spaced vertical side frames between which are disposed and supported various frames or tracks, including vertically movable upper tracks on which vehicles are supported, other vehicles being disposed within the trailer between the side frame thereof.

In vehicle transports of the type above described, it has been customary for the relatively spaced side-frames or panels of the trailer, to be interconnected adjacent their upper edges by suitable fixed cross-members or ties for contributing to lateral stability of the entire superstructure. Even where the track assemblies for supporting the uppermost tier of vehicles have been swingably supported from these cross-ties, the cross-ties or cross frame members have nevertheless constituted immovable obstacles restricting the height of vehicles loaded into the carrier therebeneath. Moreover, even though one end only of the track assembly or frame, may be supported by such a fixed cross-member or cross-tie, the said end is accordingly deprived of any vertical adjustability, making it impossible to adjust the height of both ends to fully utilize the space available therebeneath for efficient placement of vehicles. Even in instances where such track assemblies have been vertically adjustable, no provisions have been made for independently vertically adjusting the opposite ends of each such frame or track assembly and the vehicle supported thereby so as fully to utilize the space available in the carrier while securing the lowest possible center of gravity and the lowest possible overhead clearance for passage beneath overpasses and the like. Because of these limitations, many prior vehicle carriers have been limited to the hauling of certain specific makes and types of the vehicles in certain specific arrangements, particularly adapted to the measurements and shapes of the respective vehicles.

In accordance with the present invention, the sole interconnections or cross-connections between the proposed side-frames or panels of the trailer superstructure above the trailerbed are vertically adjustable throughout very substantial ranges of adjustment whereby to be capable of movement out of the path of the vehicles during movement and storage of the latter within the trailer. Such connections at the same time, by firmly interconnecting the side frames or panels of the superstructure, contribute to their lateral stability to resist both swaying and relative lateral movement between the side frames.

Moreover, in accordance with the invention, such connections in the form of guide bars or cross-ties between the side frames are utilized as pivotal supports for one end of an upper track assembly, power means being provided for vertically adjusting such tie-bars. Means are also provided for supporting and vertically adjusting the opposite end of each such track assembly, the opposite ends of the assembly thus being independently vertically adjustable, whereby the assembly and any vehicle supported thereon may have its opposite ends separately and independently adjusted to a minimum height or level as permitted by vehicles therebeneath, thus to achieve a low center of gravity for the loaded carrier and to achieve a minimum clearance or overhead to facilitate passage beneath bridges and overpasses.

In accordance with certain specific features of the invention, there is included a novel disposition of a middle track assembly and means for independently adjusting the height of the opposite ends thereof whereby a vehicle may be supported thereon between the upper and lower tiers of vehicles in a minimum amount of space at whatever angle and disposition of its opposite ends may be necessary in order to secure clearance with adjacent vehicles.

Further, there is provided a novel arrangement and disposition of power units and stabilizing means for vertically adjusting the respective track assemblies, whereby such power units and stabilizing means are disposed within vertical planes common to the respective side frames of the trailer superstructure, thereby allowing a maximum width for passage of vehicles between the side-frames.

Also, there is provided a novel arrangement for guiding the power units and their associated stabilizers in the longitudinal swinging movement which occurs incident to relative vertical adjustment of the opposite ends of a track assembly, to laterally confine such swinging movement to predetermined longitudinal paths, thereby further contributing to the lateral stability of the structure.

In a modified form of the invention, there is incorporated a novel arrangement of the track assembly including longitudinally swingable extensible and contractable power units supporting its opposite ends for independent vertical adjustment, in combination with a linkage for determining the longitudinal position of said track assembly throughout its range of adjustment.

Exemplifications of the invention are illustrated in the accompanying drawings, in which:

FIG. 1 is a side elevation of a vehicle carrier incorporating the preferred features of the invention.

FIG. 2 is a side elevation, on an enlarged scale, of the tractor shown in FIG. 1.

FIG. 3 is an enlarged detail section on the line 3—3 of FIG. 2.

FIG. 4 is a side elevation on an enlarged scale, of the trailer per se, shown in FIG. 1.

FIG. 5 is a vertical cross-section on the line 5—5 of FIG. 4.

FIG. 6 is a fragmentary side elevation, on a greatly enlarged scale of that portion of the trailer containing the forward upper track assembly and its associated operating and adjusting means.

FIG. 7 is a fragmentary side elevation on a similarly enlarged scale, of that portion of the trailer containing the rear upper track assembly and its associated operating and adjusting means.

FIG. 8 is a detail fragmentary view, partly in elevation and partly in section, on the line 8—8 of FIG. 6.

FIG. 9 is an enlarged fragmentary view on the line 9—9 of FIG. 7.

FIG. 10 is an enlarged fragmentary view on the line 10—10 of FIG. 6.

FIG. 11 is an enlarged detail view on the line 11—11 of FIG. 7.

Figure 12:
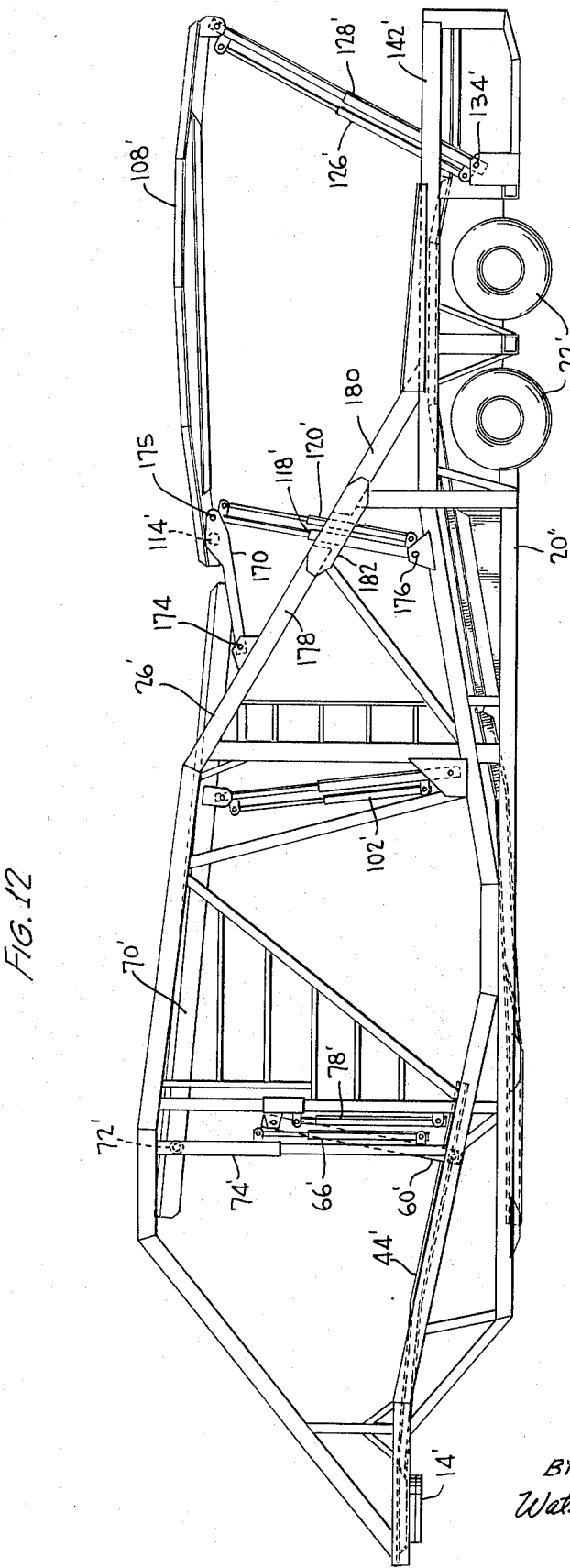
FIG. 12 is a side elevation of a somewhat modified trailer construction in accordance with the invention.

Referring now in detail to the accompanying drawings, the vehicle transport or carrier of the invention, as exemplified in its entirety in FIG. 1, comprises a conventional tractor 10, and a trailer 12 interconnected by a fifth wheel assembly 14. Tractor 10 has a main frame 16 on which is supported the superstructure 18 for supporting a vehicle over the cab of the tractor. The trailer 12 has a main frame 20 of the low bed or drop center type, the rear or trailing end of which is supported on wheels 22 and the forward end of which is supported on the tractor by way of the fifth wheel assembly 14. Supported on the trailer frame 20 is a superstructure comprising relatively spaced identical vertical sides 26 each consisting of rigid structural members rigidly interconnected in a common vertical plane to form a truss-like structure of substantial vertical depth or dimension. The relatively spaced sides or side frames 26-26 are interconnected at the bottom through the main frame 20 of the trailer.

The superstructure 18 of the tractor is provided with a rigid track assembly 28, the forward end of which is pivotally connected by the cross-bar 30 to the superstructure 18 so that the track assembly 28 is swingable about a horizontal axis provided by the cross-bar 30. The rear end of the track assembly 28 thus may be raised or lowered to any desired position of adjustment by virtue of such swinging movement and a power means is provided for effecting the said adjustment. To this end it will be seen that a fluid pressure actuated cylinder and piston unit has the cylinder 32 thereof pivotally connected at 34, to the lower end of a vertical structural element 36 of the superstructure 18, while its piston rod 38 is connected to a slide in the form of a sleeve 40 which is guided for vertical movement on the structural member 36. Such movement of the slide 40 is transmitted through link means 42 to the track assembly 28. The fluid actuated piston and cylinder unit 32, 38 is controlled in any suitable manner to swingably adjust the track assembly 28, whereby to raise or lower the rear end thereof as necessary for clearance of a vehicle carried by the trailer and projecting beneath the rear end of the track assembly 28. The slide preferably is provided with one or more holes 41, adapted to register with holes 43 in the structural member 36 whereby a locking pin may be employed in customary manner to fixedly secure the sleeve and track assembly 28 in a desired position of adjustment. The main frame 20 of the trailer provides rigid support for a substantially continuous trackway extending completely to the rear end of the trailer, and including a leading section 48 and a trailing or rear section 54 (See FIG. 4). It will thus be apparent that vehicles driven up conventional ramps and into the rear end of the said continuous trackway may be driven to a location near the forward end thereof.

As shown in FIGS. 1 and 4, a forward trackway or track assembly 44 is supported at its rear end portion by a cross-bar 45 and has its forward end pivotally and slidably associated with the trailer frame for swinging movement about a horizontal axis extending transversely of the trailer frame. Referring to FIGS. 4, 6 and 10, for raising or lowering the rear end of the track assembly 44 to the desired height of adjustment, the rear end portion of the track assembly 44 on each side thereof is connected by a link 60 to a slide 62 which, in turn, is guided for movement along a fixed vertical frame 64 of the side panel or wall structure of the trailer. The rear end of the assembly is guided for vertical movement by depending guide legs 46 slidable through sleeves 47 affixed to the trailer side frame members 49. For raising and lowering the slide 62, a vertically extensible and contractible power unit 66 is interconnected between the slide 62 and the vertical structural member 64 as by being pivotally connected to the brackets 68 and 69, respectively, on the bracket and the structural unit.

Thus, in the operation of the apparatus, when it is desired to load a vehicle onto the forward lower track assembly 44, the rear end of the latter is swung downwardly to its lowermost position and the motor vehicle may be driven along the lower tracks or track assemblies above described onto the track assembly 44, following which the track assembly 44, through actuation of the extensible and contractible power means 66, may be raised to a position such that the next vehicle or a substantial portion thereof may project forwardly beneath the track assembly 44.

Located between the opposed side frames 26 is a forward upper track assembly 70 (shown best in FIGS. 6 and 8), the opposite ends of which are independently vertically adjustable by the mechanism hereinafter described. Adjacent its forward end the track assembly 70 is pivotally supported for movement about a horizontal axis extending transversely to the side frames 26 and defined by rigid tie-bar 72 which is supported between and attached to slides 74, herein shown in the form of sleeves which are guided for vertical sliding movement up and down the vertical side frame members 26, respectively.

For simultaneously raising and lowering the slide 74 and the tie-bar 72 supported thereby, there is provided a conventional extensible and retractable power unit 78. The power unit 78 for each slide has its upper end connected to the slide by means of a bracket 80 while the lower end thereof is connected to the supporting frame 26 by way of a bracket 82.

It will be understood that the power units 78 for the respective slides 74 are controlled and and actuated in coordinated manner to maintain the tie-bar 72 in a horizontal position at all times. In addition to its functions of supporting the front end portion of the upper track assembly 70 and defining a pivotal axis about which such assembly is swingable, it will be seen that the tie-bar 72, in conjunction with the slide 74, serves to tie together the upper portions of the respective side frame members 26 so that they may mutually reinforce each other against side s way. The tie-bar 72 is fixedly connected to the respective slides 74 and the forward end portions of the separate tracks of the track assembly 70 are rigidly connected in spaced relation to a rigid tubular structure or member 83 through which they are rotatably journalled on the tie-bar 72 and, in addition, are rigidly interconnected in fixed spaced relation to each other.

Adjacent their rear ends the relatively spaced tracks of the upper track assembly are fixedly interconnected by rigid bar 84. Carried by this bar adjacent its opposite ends, and in common planes with the respective side frames 26, are brackets 86, each of which is pivotally connected at 88 to one of the two telescopically associated members 90 of an extensible and retractable stabilizer designated 92 in its entirety. The other member 94 of such stabilizer 92 is connected at 96 to a bracket 98 affixed to the vertical side frame member 100.

For raising and lowering the rear end portion of the upper track assembly 70, each of the extensible and retractable power units 102 has its opposite ends connected by way of brackets 104 and 106, respectively, to the members 90 and 92 of an extensible telescoping stabilizer and is disposed for extension and retraction parallel to the stabilizer 92 so that the stabilizer and power unit will extend and retract together and, in fact, cooperate in such manner as to form a common extensible and retractable mechanism in which the stabilizer 92 functions primarily to maintain alignment and to impart rigidity to the entire structure, both during extension and retraction thereof and during transport of a vehicle on the upper track assembly. Holes 91 and 93 are provided in the stabilizer sections for reception of a conventional locking pin. As in the case of the power units for the forward end portion of the track assembly 70, the power units 102 for the rear end portion thereof are actuated and controlled in any conventional manner and by any conventional means to achieve simultaneous and equal extension thereof so as to maintain the rear ends of the separate tracks of the track assembly 70 at a common level or, in other words, horizontally opposed to each other, being assisted in this by the rigid interconnection between these tracks provided by the tie-bar 84.

It will be apparent that within the rather substantial range of movement of the power units 78 and 102, the opposite end portions of the track assembly 70 are independently vertically adjustable, both to facilitate the passage of vehicles therebeneath during loading operations and thereafter, when supporting a vehicle, to lower the respective ends of same independently to the greatest extent possible, while achieving clearance of vehicles disposed therebeneath.

At the rear end of the trailer, and as illustrated in FIGS. 7, 9 and 11, between the side frames 26 the rear upper track assembly 108, the tracks of which are rigidly interconnected by transverse members 110 and 112, respectively, in substantially the same manner as in the forward track assembly 70. The tubular front cross-frame member 110 of the assembly is journaled on a transverse tie-bar 114, the opposite ends of which are respectively connected to and supported by slides 116 in the form of sleeves which are guided for movement up and down the vertical side frame members 118. An extensible and retractable power unit 120 is connected at one end to a bracket 122 carried by each slide 116 and the lower end of the same unit is fixedly connected through a bracket 124 to the side frame structure, whereby extension and contraction of the units 120 will raise and lower the slides 116.

As in the case of the upper track assembly 70, the power units 120 on each of the side frames are actuated in coordinated relation to simultaneously raise and lower their respective slides 116.

Also as in the forward upper track assembly 70, the rear end of the rear upper track assembly 108 is raised and lowered about the pivotal axis 114 and maintained in any desired position of adjustment about such axis by means of an extensible and contractable power unit 126 which is stabilized and maintained in alignment by stabilizer 128, comprising an assembly of telescoping tubes, one of which is pivotally connected at 130 to a bracket 132 carried by said assembly. The lower end of the stabilizer is pivotally connected at 134 to a bracket 136 affixed to the main frame 20 of the trailer.

The opposite ends of the stabilizer 128 are connected to the opposite ends of the power unit 126 by way of the brackets 138 and 140 so that the two will be extended and retracted together, the power unit serving to supply the necessary extension and retracting force while the stabilizer supplies the desired rigidity to maintain the parts in alignment while supporting the very substantial weight of a vehicle on the rear upper track assembly 108.

It is to be particularly noted that a high degree of lateral stability is secured by virtue of the specific relationship of the stabilizer 128 and power unit 126; with respect to their associated side frames 26. The stabilizer 128 on each side of the trailer is guided for swinging movement about its pivot 134 between and in sliding engagement with the relatively spaced plates 142–142 at the rear end of each side frame. By virtue of this arrangement, lateral stability of the track assembly 108 and any vehicle supported thereon is assured.

It will be apparent that either the front or the rear end of the rear track assembly 108 may be vertically adjusted independently of the other, the opposite ends of the track assembly being swingable about the pivotal axes 114 and 130, respectively, responsive to raising or lowering of either end relative to the other and may be arranged at any of various desired heights.

In addition to the two adjustable upper track assemblies above described, the vehicle carrier of the invention also includes an adjustable middle track assembly, designated 144 in its entirety and best shown in FIG. 4, this also being arranged for independent vertical adjustment of its opposite ends by suitable power units. As with the track assembly heretofore described, the laterally opposed tracks of the assembly 144 are rigidly interconnected in spaced parallel relation in any suitable manner. Slides such as 146 guided for vertical movement on the transversely opposed side frame members 100 support between them a cross-member 148 on which the forward end of the the middle track assembly 144 is supported for vertical swinging movement. Each slide 146 is raised and lowered to selected positions of adjustment by means of an extensible and retractable power unit 150, pivotally connected to the main frame 20 at 152 and pivotally connected to the slide 146 at 154.

The rear end of the middle track assembly 144, when in its lowered or transport position, as shown in full lines in FIGS. 1 and 4 rests on and is supported at either side by fixed supports 258 in the respective side frame members 100.

In each of the side frame members 100 an extensible and retractable power unit 164 extends diagonally from its pivotal connection 166 to the main frame 120 and has its upper end pivotally connected at 168 to the rear end portion of the track assembly 144. Thus extension of the diagonally disposed power unit 164 will raise the rear end of the track assembly 144 and retraction thereof will lower the rear end of the said assembly.

It will therefore be apparent that the opposite ends of the track assembly may be independently raised and lowered as desired through suitable actuation of their respective power units 150 and 164, and will be stabilized in all lateral directions by virtue of the guiding action of the vertical side frame members 100 and 118 with respect to the slides or sleeves 146 and the telescoping guides 156.

It is to be particularly noted that the track assembly 144, by suitable action of its power units 150 and 164 may be raised from its full line lowered or transport position of FIG. 4 to a fully elevated position, shown in broken lines in FIG. 4, in which it spans the gap between the front and rear upper track assemblies, to serve as a bridge between them for loading and unloading purposes.

Attention is particularly directed to the fact that in the above described structure, the only interconnections between the opposed side frame 26, except for the main frame 20 extending between the bottom edges thereof, is provided by the vertically adjustable tie-bar and pivot members 72 and 114 of the front and rear upper track assemblies 70 and 108, respectively, and by the vertically adjustable tie-bar and pivot 148 of the middle track assembly 144. By virtue of this arrangement, there are no fixed cross-ties or interconnections between the side frames at locations above the lower track assemblies which cannot be vertically adjusted to permit ready movement there-past of vehicles incident to loading and unloading of the carrier. At the same time the afore-said combined tie-bars and pivots function in all of their positions of vertical adjustment to provide rigid interconnections between the opposed side frames at suitably located points to contribute appreciably to the lateral stability of the entire super structure constituted by said side-frames and to the vehicles supported thereby.

It will be appreciated further that all of the power units and their associated stabilizing means heretofore described are located in vertical planes common to their respective side frames, so as to avoid unduly increasing the width of the carrier and so as to permit maximum usage of the space between the side frames for positioning of vehicles.

In the use of the vehicle carrier of this invention, in order to load the vehicles onto the track assembly 28 of the tractor, the rear upper track assembly 108 has its rear most end fully lowered by appropriate actuation of its power unit 126. Referring to FIG. 1, a vehicle A is then driven up a usual temporary ramp structure extending from the rear end of said track assembly 108 to the ground onto the fixed tracks supported between the opposite sides of the main trailer frame 20, thence across the middle track assembly 144 (which, for this purpose, will have been raised to its fully elevated spanning position between the track assemblies 70 and 108, as illustrated in broken lines in FIG. 4), and thence by way of usual temporary ramps or tracks from the track assembly 70 onto track assembly 28 overlying the cab of the tractor 10. In the same manner, the next two vehicles are positioned on the track assemblies 70 and 108, respectively, the vehicle being designated, respectively, as A, B and C in a direction from front to the rear.

In order to load the remaining vehicles, the rear or trailing end of the rear upper track assembly 108 is substantially fully raised by suitable actuation of its power unit 126 to provide clearance for passage therebeneath for a further vehicle D. The middle track assembly 144 is maintained fully raised at both ends thereof by its associated power sources or units 150 and 164, respectively, to permit the vehicle D to move therebeneath and thence on to the forward lower track assembly 44, the rear end of which will have been swung downwardly through actuation of its associated power unit 66. After the vehicle D is received on the forward lower track assembly 44, the rear end of the latter is elevated to provide clearance therebeneath for the next vehicle E which is moved onto the lower ramps and advanced forwardly to the position shown, the middle track assembly 144 still being in its position. At this time, the forwardly presented end of the vehicle E will project beneath the tack assembly 44, while the rearwardly presented end thereof will project beneath the track assembly 144. The forward end of track assembly 144 will then be lowered until it just clears the said vehicle and the rear end thereof will be lowered substantially to the greatest extent permitted by its associated power unit 120 to rest on the stationary supports 158 as shown in full lines in FIG. 4.

The track section 54, which is hinged at 169 to the frame 20 is swung upwardly to the broken line position of FIG. 4, and supported in that position in any suitable manner while the vehicle F is driven into the rear end of the trailer and over track section 54 onto the middle track assembly 144. The last vehicle G then is driven into the rear end of the trailer on the lower track ways into substantial abutment with the preceding vehicle F, the trailing end of the middle track assembly 144 being then raised by its associated power unit 120 sufficiently to provide clearance for reception therebeneath of the forwardly presented portion of the said vehicle G.

In accordance with usual practice, all of the vehicles upon being received in their proper positions, are firmly tied down or secured against movement in conventional manner and when all are positioned on the carrier, the various track assemblies are all vertically adjusted by the respective power units to position each vehicle in the lowest position practicable, without damaging vehicles therebeneath, so that the center of gravity of the loaded carrier is at minimum height and no part of any vehicle loaded thereon will project upwardly higher than a predetermined vertical clearance which must be maintained in order that the loaded carrier may pass safely beneath bridges and overpasses.

It should be readily apparent that the various extensible and retractable power units such as 78, 102, 120 and 126, employed for raising and lowering the track assemblies, may be of various types within the scope of the invention. For instance, it is contemplated that such units may consist of double acting hydraulic piston and cylinder units of a conventional nature or that they might comprise, for instance, interengaged threaded elements disposed for relative rotation to effect the extension and/or contraction of the unit and such relative rotation may be produced by power driven means, such as electric motors. Further, it will be appreciated that the various stabilizers, such as 92 and 128, may be omitted, providing the power units are made sufficiently rigid to withstand the operational stresses to which they will be subjected and to provide firm stable support for the various track assemblies and the vehicles supported thereon for transport.

In general, the manner of loading the vehicles onto the trailer is similar to that disclosed in the U.S. Pat. No. 3,163,459 to Dyori et al. of Dec. 29, 1964.

In the modified embodiment of the invention shown in FIG. 12, except as to the features hereinafter specifically noted, the arrangement is substantially similar to that described in connection with the preferred embodiment, and corresponding parts are designated by similar but primed reference characters. Thus, as in the preferred embodiment, there are disposed between the opposite sides of the main side frames 26', and at substantially the level thereof, a substantially continuous series of normally stationary track assemblies or tracks defining a roadway for the loading and unloading of vehicles extending along substantially within the entire length of the lower frame from the rear end thereof to the adjustable lower track assembly 44' at the forward end of the frame. This lower track assembly 44' is vertically swingable about its forward or leading end under the control of a power unit 66' to which it is connected by a link 60', just as in the preferred embodiment.

Similarly, as in the preferred embodiment, the forward end supported for swinging movement about a horizontal tie-bar 72' interconnected between the slides 74' so as to define a vertically adjustable axis for swinging movement of the track assembly 70'. The opposite end portions of the track assembly 70' are independently vertically adjustable as in the preferred embodiment by means of the power units 72' and 102'.

The present modified embodiment, however, differs from the earlier described preferred embodiment primarily in the omission of the middle track assembly, such as 144, or the preferred embodiment and in the somewhat different arrangement of the stabilizing means for the rear upper track assembly 108'. It will be recalled that in the preferred embodiment above described, the forward end of the rear track assembly 108 was swingably supported by the tie-bar 114, guided by the sleeves 116 for vertical movement up and down fixed vertical frame members 118, under the control of power units 120 interconnected between the trailer frame and the guide sleeves on either side of the trailer. Thus, only the power unit and its associated stabilizers 126 and 128, respectively, at the rear or trailing end of the track assembly 108, were swingable in a longitudinal direction to accommodate longitudinal displacement of the rear end of the track assembly arising from the relatively independent vertical adjustment of its opposite ends. In the present arrangement, the power units 120' and 126' and their associated stabilizers 118' and 128', respectively, are swingable longitudinally, and the longitudinal position of the track assembly 108' is determined and maintained by links 170 preferably interconnecting the opposite sides of the track assembly 108 to the respective opposed side frames 26' of the trailer. Each such stabilizing link 170 is thus pivotally connected to its adjacent side of the assembly 108' at 114' and is pivotally connected to its associated side frame 26' at 174.

The power unit 120' has its opposite ends respectively connected to the telescopically associated members of a stabilizer 118', the opposite ends of which are pivotally connected at 175 and 176, respectively, to the track assembly 108 and the main trailer frame 20. Thus, it will be seen that as the forward end of the track assembly 108 is raised and lowered by actuation of the power unit 120', its forward end will be guided in a path of movement concentric to the pivotal connection 114 between the link 170 and the side-frame 26'.

The opposite sides of the track assembly 108' are rigidly tied together in spaced parallel relation by conventional means, including a tie-bar defining the pivot 114', and the upper ends of the power units 120' and their associated stabilizers or guide 118' on the opposite sides of the trailer are interconnected in rigidly spaced relation by the upper track assembly or frame 108'. Each such power unit 120' and its associated stabilizer 118' is disposed for swinging movement in the vertical plane of its side frame 26' in the space between the relatively aligned and adjacent end portions or frame members 178 and 180, respectively, and between guide plates 182 which interconnect the said frame members or sections 178 and 180. Guide plates 182 thus confine and guide the power units 120' and their associated stabilizers in predetermined and parallel longitudinal paths to thus prevent side sway of these parts and their associated track assembly 108'. At the same time the track assembly ties together the upper ends of these said parts and acts through the associated power units and stabilizers to crossconnect and laterally stabilize the opposed side frames 26'.

The rear end of the track assembly 108' is adjustably supported in substantially the same manner as in the preferred embodiment by the power unit 126' and its associated stabilizer 128' both swingable about a pivotal connection 134' to the frame 20' of the trailer. It will be seen that these parts are guided in their swinging movement by frame sections in the form of guide plates 142' disposed on opposite sides of each power unit 126' and its associated stabilizer 128'. These plates 142' thus impart lateral stability to the structure in the same manner as heretofore described in the preferred embodiment.

The manner of loading and unloading the modified trailer will be readily apparent, being substantially similar to that above described in connection with the preferred embodiment, except that the middle track assembly 144 and the operation thereof described in connection with the preferred embodiment are omitted.

It is to be particularly noted that in each of the illustrated embodiments of the invention, each track assembly is firmly secured against horizontal displacement, both from side to side and in a fore and aft direction, as for instance by the cooperating slides 74, 146, 116 in the preferred embodiment, together with the guide plates 142, and by corresponding slides and the link 170 and guide plates 182 in the embodiment of FIG. 12.

It is to be understood that the drawings and descriptive matter are in all cases to be interpreted as merely illustrative of the principles of the invention rather than as limiting the same in any way, since it is contemplated that various changes might be made in the various elements to achieve like results without departing from the spirit of the invention or the scope of the appended claims.

Having thus described my invention, I claim:

1. A vehicle transport comprising a low-bed trailer having relatively spaced apart vertical side-frames, a plurality of relatively longitudinally spaced cross-ties extending horizontally between and interconnecting the upper portions of said side-frames in fixedly spaced relation, means interconnecting said cross-ties to the respective side-frames for vertical adjustment, first power means for vertically adjusting each of said cross-ties, said cross-ties constituting the sole means interconnecting the upper portions of said side-frames, upper track assemblies carried by the respective cross-ties for vertical swinging movement about horizontal axes defined by the respective cross-ties, and further power means connected to each said track assembly at locations eccentric to said axes for swinging adjustment about said axes, said transport including transversely opposed pairs of slides guided for vertical movement on the respective side frames, each said cross-tie interconnecting and being supported between one of said pairs of slides for vertical adjustment therewith, said first power means being operatively associated with the respective said slides.

2. A vehicle transport as defined in claim 1, in which said side-frames respectively include pairs of transversely opposed vertical frame members, said slides, respectively, being guided for vertical movement on said vertical frame members.

3. A vehicle carrier as defined in claim 2, in which each said slide comprises a tubular sleeve slidably encompassing and guided for vertical movement on one of said transversely opposed vertical frame members.

4. A vehicle transport comprising a low-bed trailer having relatively spaced apart vertical side-frames, a plurality of relatively longitudinally spaced cross-ties extending horizontally between and interconnecting the upper portions of said side-frames in fixedly spaced relation, means interconnecting said cross-ties to the respective side-frames for vertical adjustment, first power means for vertically adjusting each of said cross-ties, said cross-ties constituting the sole means interconnecting the upper portions of said side-frames, upper track assemblies carried by the respective cross-ties for vertical swinging movement about horizontal axes defined by the respective cross-ties, and further power means connected to each said track assembly at locations eccentric to said axes for swinging adjustment about said axes, said transport including transversely opposed pairs of slides guided for vertical movement on the respective side frames, each said cross-tie interconnecting and being supported between one of said pairs of slides for vertical adjustment therewith, said first power means being operatively associated with the respective said slides, said upper track assemblies being relatively longitudinally spaced apart, there being a middle track assembly below said upper said track assemblies in the space therebetween; means for independently vertically adjusting the opposite longitudinal end portions of said middle track assembly, and a further pair of slides guided for vertical movement on the respective side frames, said middle track assembly being connected to said slides for swinging movement about a horizontal axis and, with said slides, interconnecting said side frames in relatively fixed transversely spaced relation.

5. A vehicle transport as defined in claim 4, including means pivotally connected to said middle track assembly at a location eccentric to the axis of its said swinging movement for vertically adjusting the latter about said axis.

6. A vehicle transport including a trailer having a low bed, relatively transversely spaced vertical side frames supported thereon, a track assembly supported between the upper portions of said side frames for independent vertical adjustment of its front and rear end portions, power means for effecting such independent adjustment comprising transversely spaced pairs of rigid extensible and retractable parallel power units, the upper ends of one such pair being pivotally connected to the forward end portion of said assembly and the upper ends of the other said pair of units being pivotally connected to the rear end portions of said assembly, the lower ends of said power units being pivotally connected to said respective side frames, and means interconnecting said one assembly to said respective side-frames to control the longitudinal position of said assembly with respect to said side frames, said last-mentioned means comprising a stabilizing link pivotally connected to each said side frame for vertical swinging movement and having a free end pivotally connected to said assembly.

* * * * *